May 6, 1941.　　　　　R. H. STONE　　　　　2,240,526
RADIO SHIELDING OF ENGINE IGNITION
Filed Jan. 23, 1936　　　　4 Sheets-Sheet 1

R. H. Stone　INVENTOR
BY
Thomas Howe　ATTORNEY

May 6, 1941.   R. H. STONE   2,240,526
RADIO SHIELDING OF ENGINE IGNITION
Filed Jan. 23, 1936   4 Sheets-Sheet 2
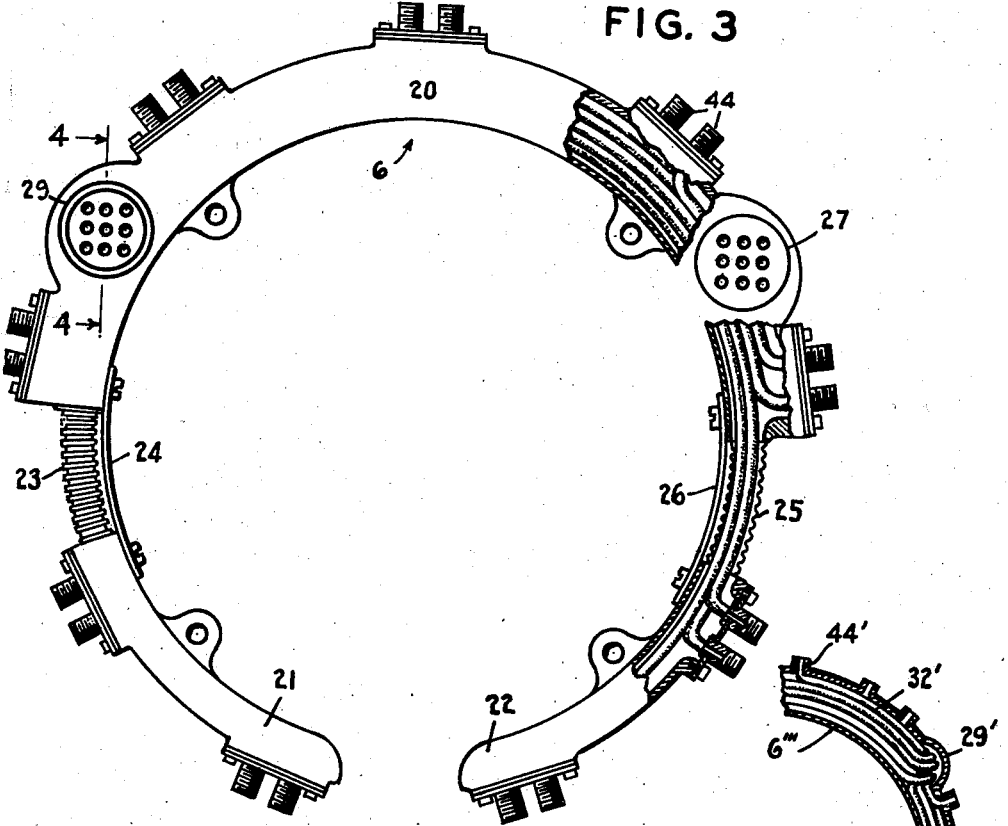
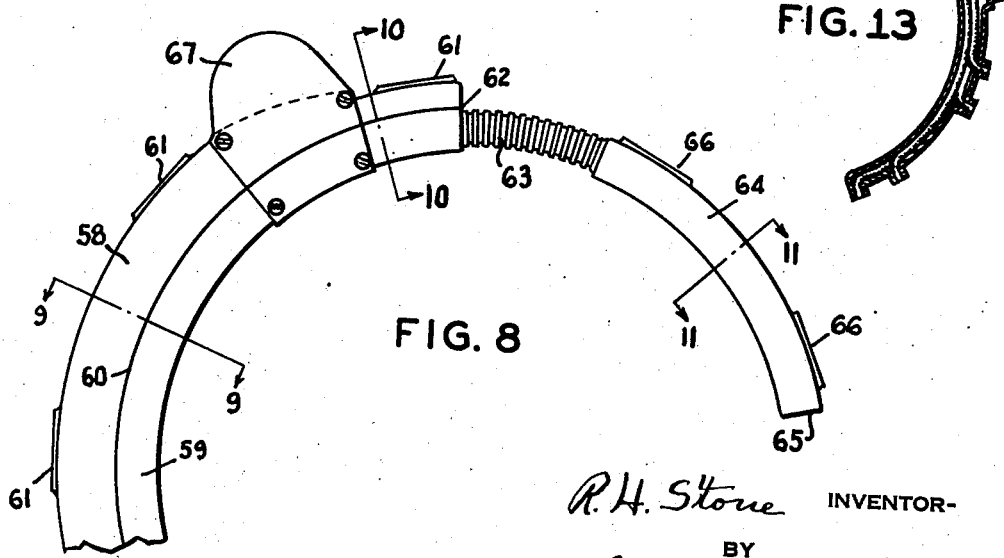

May 6, 1941.　　　　　R. H. STONE　　　　2,240,526
RADIO SHIELDING OF ENGINE IGNITION
Filed Jan. 23, 1936　　　4 Sheets-Sheet 3

R. H. Stone INVENTOR
BY
Thomas How ATTORNEY

May 6, 1941.  R. H. STONE  2,240,526
RADIO SHIELDING OF ENGINE IGNITION
Filed Jan. 23, 1936  4 Sheets-Sheet 4
FIG. 14
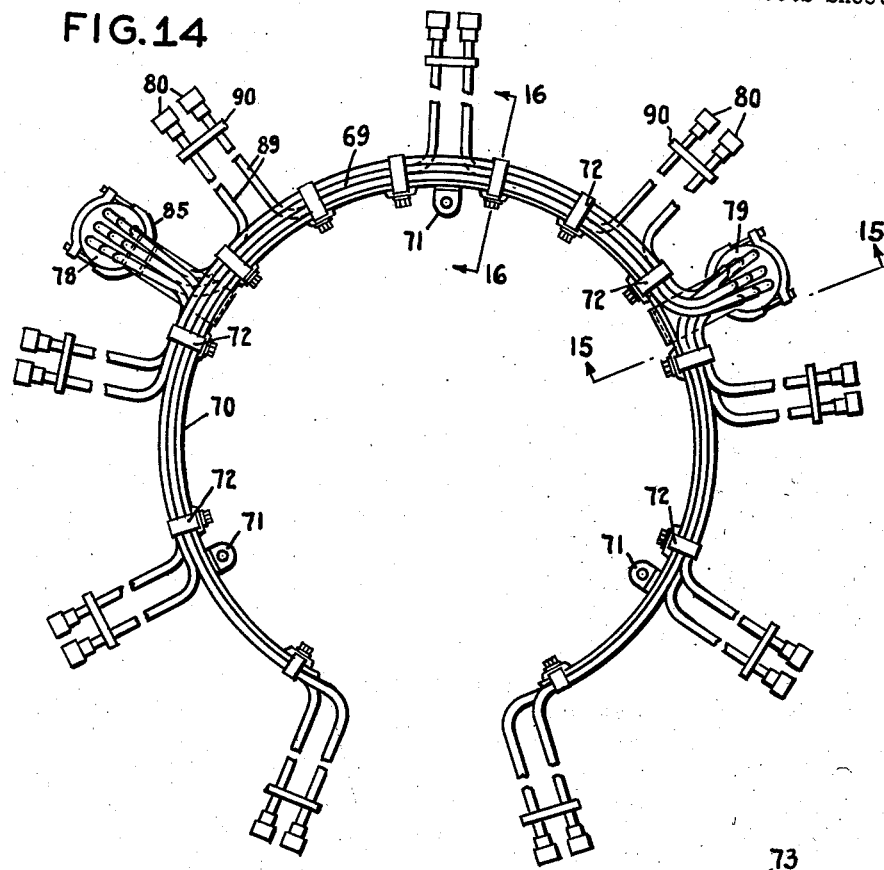
FIG. 15
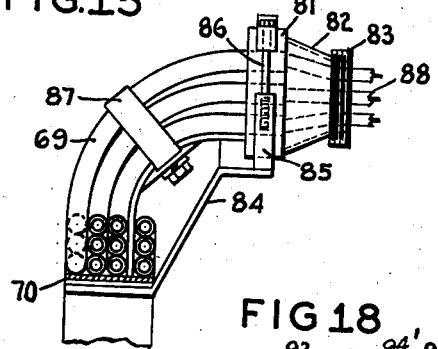
FIG. 16
FIG. 17
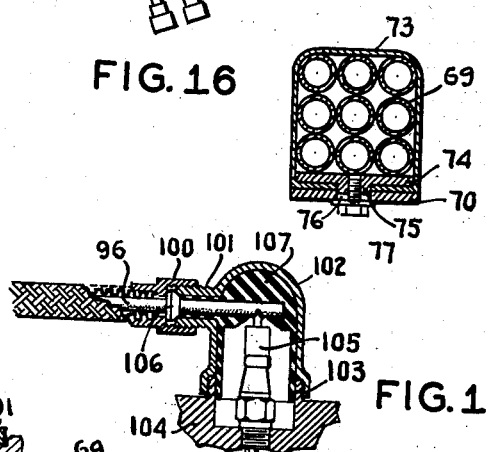
FIG. 18
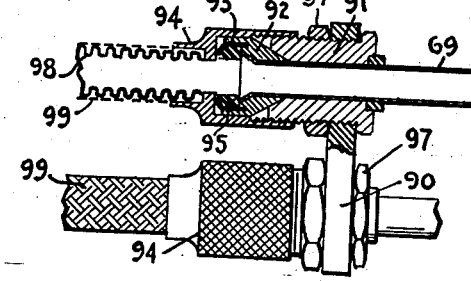
R. H. Stone INVENTOR.
BY Thomas Howe
ATTORNEY.

Patented May 6, 1941

2,240,526

UNITED STATES PATENT OFFICE 2,240,526

RADIO SHIELDING OF ENGINE IGNITION

R. Harry Stone, Bound Brook, N. J., assignor to Titeflex Metal Hose Co., a corporation of New Jersey Application January 23, 1936, Serial No. 60,425

8 Claims. (Cl. 123—148)

This invention relates to the shielding of ignition wires of internal combustion engines so that their effect upon neighboring radio apparatus will be reduced or entirely eliminated, and to the manifold, that is the structure embracing the engine shaft serving to locate and guide the ignition conductors about the shaft to their respective cylinders.

One of the main objects of the invention is to produce an improved construction and arrangement of manifold.

Another object of the invention is to provide efficient radio shielding means for the ignition conductors.

A further object of the invention is to provide a manifold which shall be light in weight and securely hold the conductors.

A further object of the invention is to provide a manifold to and from which the spark plug leads are readily attachable and detachable.

A further object of the invention is to provide a manifold to which the leads to the magneto or other source of ignition current are readily attachable and detachable.

A further object of the invention is to provide a manifold having cross connecting wires therein between the magneto leads and the spark plug leads such that some or all of the leads from the manifold may be attached or detached without disturbing the conductors within the manifold.

A further object of the invention is to provide a manifold for the ignition conductors which may be readily placed in position upon or removed from the engine.

A further object of the invention is to provide a manifold wherein the drawing in of conductors is facilitated.

Other and ancillary objects of the invention will appear hereinafter.

In the accompanying drawings which illustrate the invention:

Fig. 3 is a front elevation of the manifold for the ignition wires on an enlarged scale, and partly broken away to show a longitudinal section;

Fig. 8 is a side elevation, partly broken away, of a modified form of manifold;

Fig. 13 is a central longitudinal section, on a reduced scale, partly broken away, of a modified form of manifold;

Fig. 14 is an elevation of a modified construction of manifold, some of the parts being broken away;

Fig. 15 is an enlarged section on the line 15—15 of Fig. 14;

Fig. 16 is a section, on an enlarged scale, on the line 16—16 of Fig. 14;

Fig. 17 is an enlarged sectional view showing the manner of connecting the ignition wire with a spark plug; and Fig. 18 is an enlarged view, partially in section, showing the manner of joining the armor or conduit for an ignition wire with the manifold conduit, and also a side elevation of such connection together with a strip or bar connecting the two conduits for one cylinder together whereby they are mutually supported.

Figure 1:
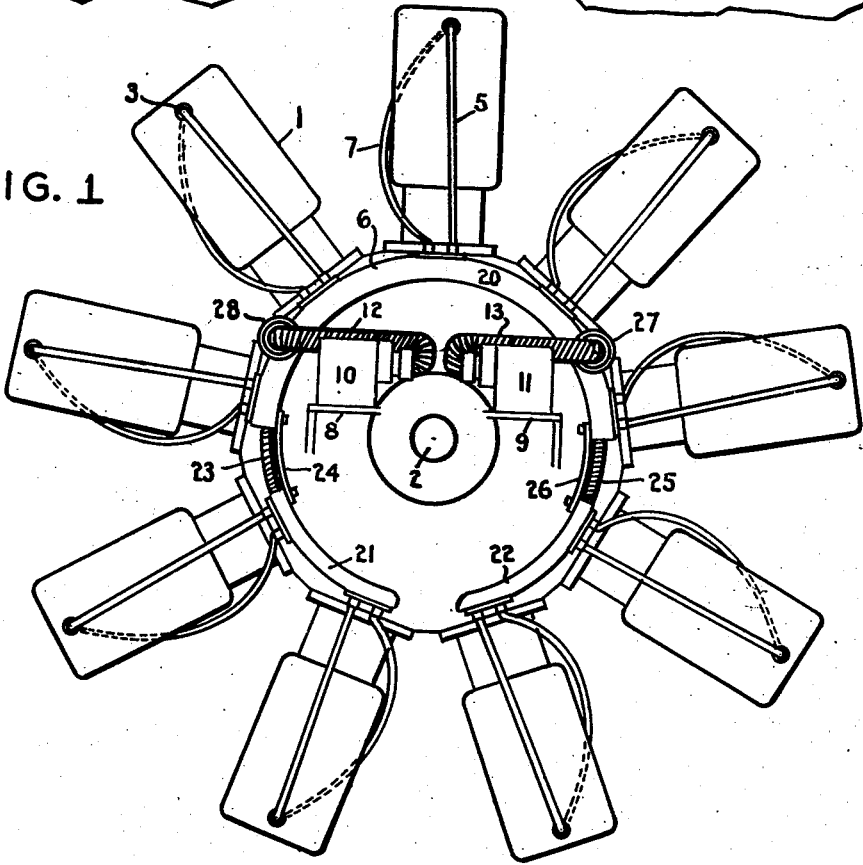
Fig. 1 is a front elevation of an aeroplane engine to which the invention is applied.

Referring to the drawings and first to Figs. 1 to 7 inclusive, the radial type of internal combustion engine as commonly used in aeroplanes and as shown in front elevation in Fig. 1, has the radial cylinders 1 distributed about the engine shaft 2 in a manner as is well understood in the construction of such engines. Each of the cylinders is provided with a spark plug 3 at the forward (the propeller) side and another spark plug 4 at the rear of the cylinders. Corresponding to each of the cylinders there is a conduit 5 leading to the forward plug 3 from the manifold 6 and leading from the said manifold to each spark plug 4 is a conduit 7.

Mounted upon brackets 8 and 9 on the forward portion of the engine are magnetos 10 and 11 for supplying ignition current to the spark plugs. The ignition wires extending from the usual timer (suitably connected with the magneto 10) pass through a flexible metal conduit 12 to the manifold 6, and similarly the conductors from the timer which is associated with the magneto 11 are conducted to the said manifold through a flexible metal conduit 13.

Within the manifold 6 are cross connecting conductors whereby appropriate ones of the conductors leading from the timers and magnetos to the manifolds are connected with the several conductors in the conduits 5 and 7 leading to the various spark plugs. The timers and magnetos being enclosed in metal, the conduits from the timers to the manifold being of metal, the manifold casing being of metal and the conduits from the manifold to the spark plugs being of metal and joining a metal shield about the spark plug, it will be seen that the ignition will be shielded so that it will not unduly affect neighboring radio apparatus.

The manifold 6 comprises a tubular metal casing 20 which is relatively rigid and also the two tubular metal sections 21 and 22 constituting the ends of the manifold and having their outer ends closed are also relatively inflexible. In order to permit the manifold as a whole to be flexed in order that it may be readily placed in or removed from position about the engine shaft, a flexible metal tubular conduit 23 is connected with the ends of the sections 20 and 21 in a fluid tight and secure manner as by soldering the section 23 in the ends of the sections 20 and 21 whereby the sections 20, 23 and 21 form a fluid-tight conduit for the conductors. The flexible section 23 may be of any suitable construction of flexible metal tube, for instance such as is described in the Patent No. 1,198,392, Louis H. Brinkman, September 12, 1916.

When the manifold has been placed in position a relatively stiff plate or strip 24 may have its ends secured to the ends of the sections 20 and 21 whereby flexure at the flexible section is prevented and so accidental disarrangement or displacement is avoided, the plate or strip 24 being removed during the installation or removal of the manifold and so permitting the flexible section to flex during such operation. The other end of the section 20 is similarly connected by a flexible conduit 25 with the end of the section 22, the stiff strip 26 when secured to the ends of the sections 20 and 22 across the flexible section 25, permitting the flexing of the last mentioned section, but when the strip is in position upon the sections 20 and 22 the flexing is prevented and the parts are held rigidly in position.

The manifold is provided with an enlarged outlet 27 housing socket contacts for connecting the conductors from the magneto 11 with the cross connecting conductors within the manifold and similarly upon the other side is an enlarged outlet 28 housing similar means for connecting the conductors from the magneto 10 with the cross connecting conductors within the manifold.

Figure 4:
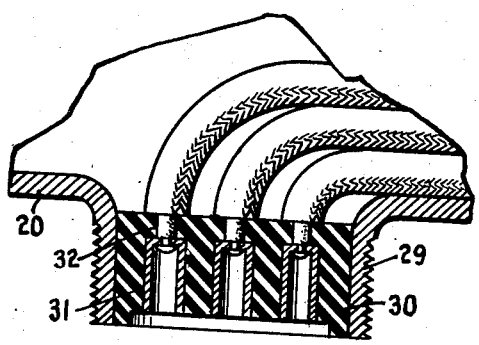
Fig. 4 is a fragmentary section on the line 4—4 of Fig. 3 showing in enlarged cross section the socket connection on the manifold to which the wires in the manifold are connected.
Figure 6:
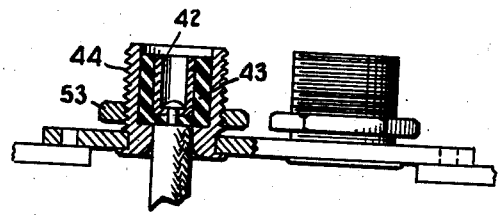
Fig. 6 is to the same scale as Figs. 4 and 5 and is a side elevation of the nipples and socket contacts of the manifold whereby the lead wire from the manifold and the conduit enclosing the same may be secured to the manifold wire, the view being broken away to show a section on the line 6—6 of Fig. 2.
Figure 5:
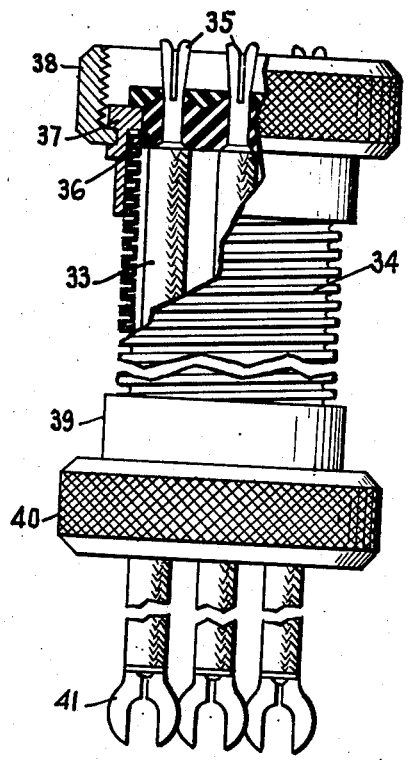
Fig. 5 is a side elevation on the same scale as Fig. 4, of a magneto lead, partly broken away to show a section of the flexible lead from the manifold to the magneto having plug connections adapted to cooperate with the socket contacts of Fig. 4.
Figure 7:
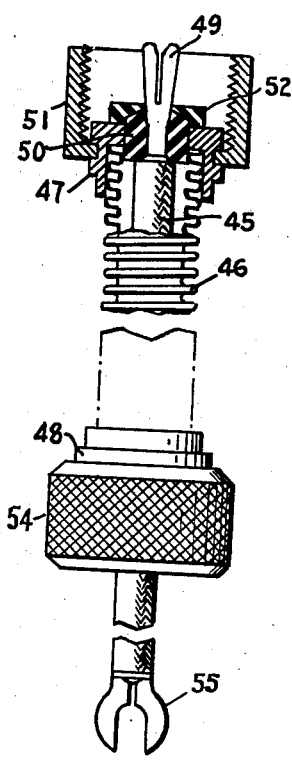
Fig. 7 is a side elevation partly broken away to show a central longitudinal section, and to the same scale as Figs. 4, 5 and 6, of a flexible conductor to establish connection between the manifold and a spark plug, and a flexible conduit therefor, this structure being adapted to cooperate with the structure of Fig. 6.
Figure 9:
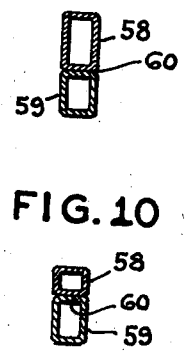
Fig. 9 is a section on the line 9—9 of Fig. 8.
Figure 10:
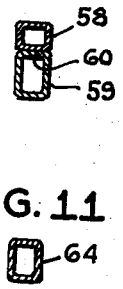
Fig. 10 is a section on the line 10—10 of Fig. 8.
Figure 11:
Fig. 11 is a section on the line 11—11 of Fig. 8.

This housing and arrangement of contacts is the same for both of the structures, 27 and 28 and is illustrated in Fig. 4 wherein it appears that the outlet comprises a threaded nipple 29 formed in the section 20 and within the nipple is secured an insulating block 30 within which are mounted the nine socket contacts 31 (one for a spark plug of each cylinder), each of the sockets being secured in conducting fashion to a conductor 32. Each of the conductors is covered with insulation so as to be individually insulated in a manner as is well understood.

To establish connection with the magneto on each of the conductors 32, there are provided nine individually insulated wires 33 enclosed in a flexible metal tube or conduit 34, which tube or conduit may be constructed as described in the above mentioned Patent No. 1,198,392, Louis H. Brinkman, September 12, 1916. Each of the conductors 33 is secured to and forms an electrical contact with a spring plug contact 35 adapted to enter within and make contact with one of the socket contacts 31. The nine plug contacts 35 are mounted in an insulation block 36 secured in a metal coupling member 37 into which the end of the conduit 34 is secured in a fluid-tight fashion, as by soldering. Swiveled upon the coupling member 37 is the interiorly threaded screw nut 38 adapted to be screwed upon the nipple 29 and to draw the member 37 and the nipple into secure fluid-tight relation when the nut 38 is tightly screwed home upon the nipple 29. When the parts are thus clamped together by the nut 38 each of the plug contacts 35 will respectively be entered within and make contact with its appropriate socket contact 31.

The other end (the magneto end) of the conduit or tube 34 is secured in a coupling member 39 similar to the coupling member 37 and in which the end of the tube 34 is secured in a similar manner. Also there is swiveled upon the member 39 an interiorly threaded nut 40 similar to the nut 38 and by which the conduit may be secured in a tight manner to a nipple upon the magneto and timer casing, which nipple is similar to the nipple 29 upon the manifold. Instead, however, of the magneto end of the conductors 33 terminating in plug contacts, each of the nine conductors is provided with a spring contact clip 41 adapted to be connected with the timer terminals.

Each of the nine conductors 32 in the manifold respectively leads to and is connected with a plug contact 42 mounted in a block 43 of insulation secured in the screw-threaded nipple 44 mounted upon the manifold. It will be observed that the conductors 32 leading from and connected with one magneto will be respectively connected with one of a pair of socket contacts, the nipples and contacts being arranged in nine pairs about the manifold as clearly appears in Fig. 1, and one of each pair is connected with one magneto and one plug of one set of spark plugs, while the other is connected with the other magneto and a plug of the other set of spark plugs.

Each socket contact 42 is connected with its respective spark plug by a flexible lead comprising an insulated conductor 45 (see Fig. 7) encased in a flexible metal tube or conduit 46 which may be of the same construction as the conduit 34. One end of the conduit is secured in a tight and secure manner in the coupling member 47, while the other end of the conduit is similarly secured in a similar coupling member 48. One end of the conductor is secured and connected to a spring plug contact 49 adapted to enter within and establish electrical connection with the socket contact 42 when the parts are in operative relation. The contact 49 is mounted in an insulating block 50 secured in the coupling member 47. Swiveled upon the member 47 is an interiorly threaded nut 51 adapted to be screwed upon the nipple 44 and hold the parts securely together with the plug 49 within and contacting with the socket contact 42.

A soft rubber gasket or washer 52 is provided so that a tight connection is formed when the nut 51 is screwed home upon the nipple 44. In order to prevent loosening of the connection between the coupling member 47 and the nipple 44, a lock nut 53 is provided which may be jammed against the nut 51 and hold it from becoming loosened.

The coupling member 48 at the other end of the tube 46 is also provided with a swiveled internally threaded nut 54 similar to the nut 51, the nut 54 engaging with a nipple on the spark plug casing so as to firmly and tightly secure the parts together.

The end of the conductor 45 opposite the plug contact 49 is provided with a contact clip 55 adapted to be secured to the usual binding post at the top of a spark plug in the manner in which ignition conductors are ordinarily secured.

It will be observed that in the foregoing described structure, the manifold structure 6 is sealed fluid-tight so that no moisture can enter therein and is provided with detachable plug switch connections whereby the magneto conductors and also the leads to the spark plugs may be detachably connected with the conductors within the manifold which appropriately connect the respective spark plug leads and magneto conductors. This permits the magneto leads or any of the spark plug leads to be removed and replaced without disturbing the conductors within the manifold or disturbing more than the lead which it is desired to remove or replace. This is of great value especially as regards the spark plug leads which are the most liable in practice to injury or deterioration. It will also be observed that the ends of the manifold are required to carry less conductors than the central portions and this is taken advantage of to lighten the structure, make it less expensive and less awkward to handle by making the cross section of the manifold less, as its ends are approached, than the intermediate sections.

Figure 2:
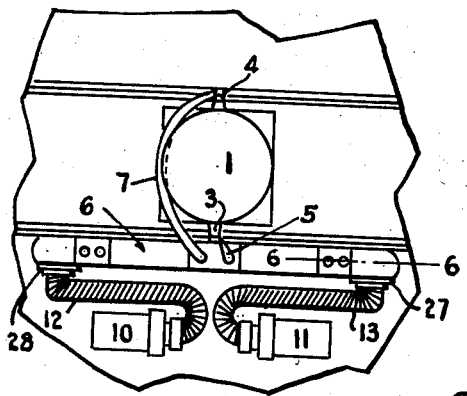
Fig. 2 is a top plan view of the apparatus of Fig. 1, partly broken away.
Figure 12:
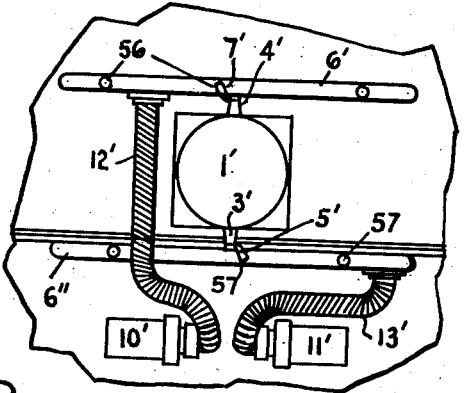
Fig. 12 is a view similar to Fig. 2 showing a dual manifold one on each side of the cylinders so that each set of spark plugs and magneto has its own manifold as distinguished from the structure of Fig. 2 wherein the sets of spark plugs and their respective magnetos have a common manifold.

In the foregoing construction the same manifold is common to the magnetos and spark plugs of the dual ignition system. It is often desirable that the ignition systems for the two sets of spark plugs be independent so that one can be repaired, inspected and removed in part or even in whole without disturbing the other. Such a dual ignition system with independent systems for the sets of spark plugs is illustrated in Fig. 12 wherein manifolds 6' and 6" are mounted at the front and rear of the cylinders 1', the manifold 6' having openings 56 for the set of spark plugs 4' only, a lead 7' extending from each opening to a spark plug 4' and the manifold being connected by a conduit 12' with one magneto 10' only, while the other manifold 6" has the openings 57 from which the leads 5' extend to the spark plugs 3' of the other set and the manifold is connected with the other magneto 11' by the conduit 13'. This independent arrangement of the systems of the two sets of spark plugs also makes it unnecessary for any of the spark plug leads to pass between the cylinders.

In Fig. 13 is illustrated a manifold the same as that in Figs. 1 to 7 inclusive except that the manifold is without any flexible section but is comparatively stiff and rigid throughout and is integrally formed. In the construction of Fig. 13 the manifold 6''' is provided with nipples 44' for the connection of the leads to the spark plugs, and within the manifold casing are the cross-connecting conductors 32' each respectively leading from a magneto conductor contact to a spark plug lead contact. It will be observed that the manifold casing tapers in cross section, being largest at its intermediate portion and of minimum cross section at its ends.

Referring now to Figs. 8 to 11 inclusive, there is therein shown a modified construction of manifold wherein the manifold comprises a series of conduits which separate the wires passing through it into groups or there might be a separate channel for each wire. This facilitates the work of drawing in new wires. This construction might be used with plug and socket connections formed at the entrance of the magneto conductors into the manifold and where the connections are made with the spark plug leads as described in connection with Figs. 1 to 7 inclusive, or the plug contacts might be omitted, continuous wires extending through the magneto conduits, the manifold and the spark plug conduits. In the latter case there would be simply openings from the manifold into the conduits mentioned.

The structure in Figs. 8 to 11 comprises the central portion of the manifold consisting of the metal tubes or conduits 58 and 59 brazed or otherwise suitably secured together along the line 60. The conduit 58 having the outlet for the leads to the spark plugs at 61. The ends 62 of the conduit 58 are closed in a fluid-tight manner. To each end of the conduit 59 is secured in a water-tight manner, as by soldering or brazing, a flexible section 63 which is a flexible metal tube and may be constructed as described in the patent to Louis H. Brinkman, 1,198,392, September 12, 1916. The other end of the section 63 is secured in a water-tight manner to a relatively stiff section of a metal conduit 64 having its end 65 tightly closed and being provided with the spark plug lead openings 66. The manifold may be filled, about the wires therein, with any well known and suitable insulating compound. This serves to more securely insulate the wires and prevent damage to them. Where the manifold is rigid this compound may be such as to become hard and unyielding but where the manifold has flexible sections as hereinbefore described, the compound in its final state should be plastic or fluid so as to permit the flexing.

The magneto leads may be introduced into the conduits by holes in the sides thereof in a manner similar to that indicated in connection with Fig. 13. The flexible section 63 is for the same purpose as the flexible section 25 of the structure of Figs. 1 to 7 inclusive.

To facilitate access to the wires within the manifold, openings may be provided in the sides of the conduits 58 and 59 which may be covered by a removable plate 67 removably held to the conduit by screws as shown whereby the opening is closed in a fluid-tight manner when the cover is in position.

Referring to Figs. 14 to 18 inclusive, the manifold therein shown comprises a number of metal tubes 69 each adapted to accommodate one conductor, these tubes being supported by a flat band or strip 70 fixed to the engine by ears 71, and the tubes or conduits 69 being clamped together and to the strip 70 by means of clamps 72. Each of the clamps (see Fig. 16) comprises a metal band 73 bound tightly about the tubes 69 and having its ends entered between the supporting strip 70 and a plate 74 having a boss 75 entering within a hole 76 in the strip 70. A screw 77 having a head overlapping the edges of the hole 76, passing through the strip 70 and in screw-threaded engagement with the plate 75 serves to draw the plate 74 toward the strip 70 and thereby grip the edges of the strip 73 between the plate 74 and strip 70 and at the same time draw the strip 73 tightly about the tubes 69. The engagement of the boss 75 in the hole 76 also holds the clamp in fixed position longitudinally of the strip. Inasmuch as the invention is illustrated in connection with the dual ignition of a nine cylinder engine there are in this illustrative case eighteen of the tubes 69 in the manifold, nine of the tubes terminating in the block 78 through which connections with one of the magnetos is made, and the other nine tubes terminating in the block 79 through which the connections with the other magneto is made. Thus tubes proceeding from the block 78 terminate respectively in one of the coupling members of each of the pairs 80, there being a pair of such coupling members for each cylinder suitably distributed about the manifold as indicated in Fig. 14. Similarly the tubes 69 leading from the block 79 (for the other magneto) terminate respectively in the other coupling members of the pairs 80. The blocks 78 and 79 are each mounted as shown in Fig. 15 wherein the block 78 is secured within the collar 81 of a coupling member having the tapered portion 82 and the threaded portion 83, the coupling member being secured upon the bracket 84 secured to the manifold supporting ring 70 by means of clamping members 85 one of which is fixed to the bracket 84 and drawn together by means of screws 86. The manifold tubes 69 which connect with the block 78 within the collar 81 are clamped together between the ring 70 and the block 78 by means of a clamp 87.

It will thus be seen that the tubes 69 corresponding to one magneto and one set of spark plugs are segregated from the other and clamped together in a unit so that the set of tubes for one magneto and its ignition system may be removed or replaced without disturbing the other. The insulated ignition conductors 88 pass through the coupling 82 and thence respectively through the tubes 69 to and through the respective couplings 80 and thence to the spark plugs, the conductor for each spark plug being continuous from the magneto to the spark plug. The outward turned ends 89 of each pair of tubes 69 pass through and are screw threaded in holes in a plate 90 which provides mutual support for the tubes. An armor for the conductors 88 extends from the coupling 83 to the magnetic shield. Such armor may be similar to that shown in Fig. 5, and is securely fastened in a fluid-tight manner by screw collars to the screw threads 83 and a similar nipple on the magneto casing as described in connection with the armored magneto connections of Fig. 5.

Each of the couplings 80 (see Fig. 18) has one of the tubes 69 entered within a coupling gland member 91 bearing against a beveled metal ring 92 to which the tube 69 is brazed. Mounted in a groove in the ring 92 is a metal band 93 adapted to bear, when the coupling is screwed up tight against the coupling member 94 to maintain electrical connection therebetween. Between a shoulder on the member 94 and the ring 92 is a washer or ring of soft rubber 95 adapted to be forced inwardly and form a fluid-tight connection with the insulated conductor 96 passing through the tube, when the gland is screwed up. The gland 91 is screw-threaded within the coupling member 95 and is provided with the wrench hold 97 by which it may be turned. The member 94 may be secured against unscrewing by means of a jam nut 94'. Within a socket of the coupling member 94 are secured the ends of a corrugated flexible metal tube 98 which may be of the construction as described in the aforementioned Brinkman patent, such tube being covered by a braided covering 99 of flat metal strands or strips, the covering 99 and tube 98 being secured in a fluid-tight manner in the member 94 by soldering, brazing or other suitable means. If desired the braided covering 99 might be omitted, or if desired the corrugated metal tube may be omitted and the braided covering 99 come directly against the insulation of the conductor. If this braided covering is tightly braided so as to cover substantially the whole of the conductor, a quite satisfactory radio shielding of the wire is realized.

The other end of the conduit or shield (tube 98 and braided covering 99) are, at the spark plug end, soldered, brazed or in any other suitable manner secured to the coupling member 100 which is screwed upon the nipple 101 on the metal spark plug casing 102 which is screwed to the nipple 103 on the engine block 104. The spark plug 105 is screwed into the engine block in the usual manner. The central contact of the spark plug has a sharp point which punctures the insulation of the conductor 96 and establishes contact with the metal conductor therein. Between the coupling member 100 and the nipple 101 is a circumferentially continuous metal ring 106. The ring being continuous it is prevented from being jammed down on the conductor to injure the insulation when the coupling is screwed up, but the ring 106 makes a fluid-tight fit with the insulation of the conductor.

It will be seen that the ring 106 has one side beveled which bears against the beveled end of the nipple 101 so that as the member 100 is screwed up the ring is tightly clamped in the coupling. The metal shield 102 is lined with a suitable insulation 107 such as Bakelite which may be molded therein.

While the invention has been illustrated in what are considered its best applications, it may have other embodiments without departing from its spirit and is not, therefore, limited to the structures shown in the drawings.

What I claim is:

1. The combination with a manifold for the ignition conductors of an internal combustion engine, said manifold adapted to embrace the engine shaft, of spark plug leads leading from the said manifold to the spark plugs and magneto leads establishing connection between the said manifold and a magneto, said manifold providing a casing for the ignition conductors, said manifold having sections of different flexibility and means for stiffening the manifold at the flexible sections.

2. A manifold for a radio shielded ignition system for an internal combustion engine comprising a fluid-tight radio shielding casing having electrical terminals mounted thereon for connecting with magneto leads and spark plug leads and conductors within said manifold establishing connections between the said magneto and spark plug terminals.

3. A manifold for a radio shielded ignition system for an internal combustion engine comprising a fluid-tight radio shielding casing having electrical terminals mounted thereon for connecting with magneto leads and spark plug leads and conductors within said manifold establishing connections between the said magneto and spark plug terminals and an insulating compound about said conductors and filling said manifold casing.

4. A manifold for a radio shielded ignition system for an internal combustion engine comprising a fluid-tight radio shielding casing having electrical terminals mounted thereon for connecting with magneto leads and spark plug leads and conductors within said manifold establishing connections between the said magneto and spark plug terminals and a hardened insulating compound about said conductors and filling said manifold casing.

5. A manifold for a radio shielded ignition system for an internal combustion engine comprising a fluid-tight radio shielding casing having electrical terminals mounted thereon for connecting with magneto leads and spark plug leads and conductors within said manifold establishing connections between the said magneto and spark plug terminals and an insulating compound about said conductors in said manifold.

6. A manifold for a radio shielded ignition system for an internal combustion engine comprising a radio shielding casing, conductors within said casing for establishing electrical connection from the magneto leads to the spark plug leads and hardened insulating compound filling said manifold about said conductors.

7. A manifold for a radio shielded ignition system for an internal combustion engine comprising an arc-shaped radio shielding casing, conductors within said casing for establishing electrical connection from the magneto leads to the spark plug leads and hardened insulating compound filling said manifold about said conductors.

8. A manifold for radio shielded ignition system for an internal combustion engine comprising a cross-sectionally rigid radio shielding casing, conductors within said casing for establishing electrical connection from the magneto leads to the spark plug leads and insulation, of greater density than the atmosphere, filling said manifold about said conductors.

R. HARRY STONE.